June 22, 1965 W. E. SCHWABE ETAL 3,190,626
SUPPORT MEANS FOR A REFRACTORY LINED FURNACE
Filed Oct. 1, 1962 2 Sheets-Sheet 1

INVENTORS
WILLIAM E. SCHWABE
ARNOLD Z. SLEEPER
LOREN E. BACON
CHARLES A. TAUSSIG
BY
ATTORNEY

June 22, 1965 W. E. SCHWABE ETAL 3,190,626
SUPPORT MEANS FOR A REFRACTORY LINED FURNACE
Filed Oct. 1, 1962 2 Sheets-Sheet 2

INVENTORS.
WILLIAM E. SCHWABE
ARNOLD Z. SLEEPER
LOREN E. BACON
CHARLES A. TAUSSIG
BY
ATTORNEY

3,190,626
SUPPORT MEANS FOR A REFRACTORY LINED FURNACE
William E. Schwabe, Niagara Falls, and Arnold Z. Sleeper, Bronxville, N.Y., Loren E. Bacon, Ramsey, N.J., and Charles A. Taussig, Westport, Conn., assignors to Union Carbide Corporation, a corporation of New York
Filed Oct. 1, 1962, Ser. No. 227,191
2 Claims. (Cl. 263—46)

This invention relates to refractory lined steelmaking furnaces, and refers more particularly to improved support means for supporting the upper wall section or portions thereof of a furnace lining.

It is known in the art to use a lining of carbonaceous bricks in a non-oxidizing furnace such as an electric arc furnace. Usually, the carbonaceous bricks have been utilized in patch-up areas or hotspots of the furnace wall where the original linings have been damaged by erosion or deterioration. These carbonaceous linings are invariably located above the slag line of the furnace and shall hereinafter be referred to as the upper lined portion of the furnace. Such upper linings have exhibited remarkably long life when compared to the service life of other refractory materials. These carbonaceous linings may be positioned in a staggered arrangement with a ceramic brick lining or they may be used alone to form a considerable portion of the upper furnace wall lining.

A variety of patterns and shapes of keyed brick designs along with supplemental refractory cements and mortars are employed as aids in supporting the entire upper and lower furnace linings. However, primary support of the upper carbonaceous lining comes from the lower or bottom half of the brick lined furnace. The lowermost bricks are usually of a ceramic material and may be acid or basic or even neutral in composition depending upon the environment with which they will be in contact.

The lower ceramic brick lining wears away long before the upper carbonaceous brick lining thereby weakening the overall lining structure. In an effort to prevent the upper lining from collapsing, a cement gun is used to deposit a refractory mixture on the weakened areas of the lower lining in order to replace any ceramic refractory material that erodes and deteriorates. However, this deposited material may not be sufficiently strong to support the upper carbonaceous brick lining.

Similar problems arise when carbonaceous bricks are installed in patches, or staggered with ceramic bricks. Here again the ceramic bricks wear away considerably faster than the carbonaceous refractory bricks. The loss of support from the adjacent ceramic bricks and the unreliable holding power of the refractory cements or ceramic mortars may cause the carbonaceous bricks to fall out of the lining long before their measured life in terms of chemical or erosion failures. Such mechanical failures defeat the purpose of using long-life carbonaceous refractory bricks.

Accordingly, the principal object of the invention is to provide improved supporting means for the upper lined portion of a steel-making furnace.

The object is achieved by a steel-making furnace having a lower lining and an upper lining, the upper lining being supported by horizontal brackets around the inner furnace wall periphery. The brackets are secured to the furnace wall by suitable means such as welds or fasteners.

Figure 1:
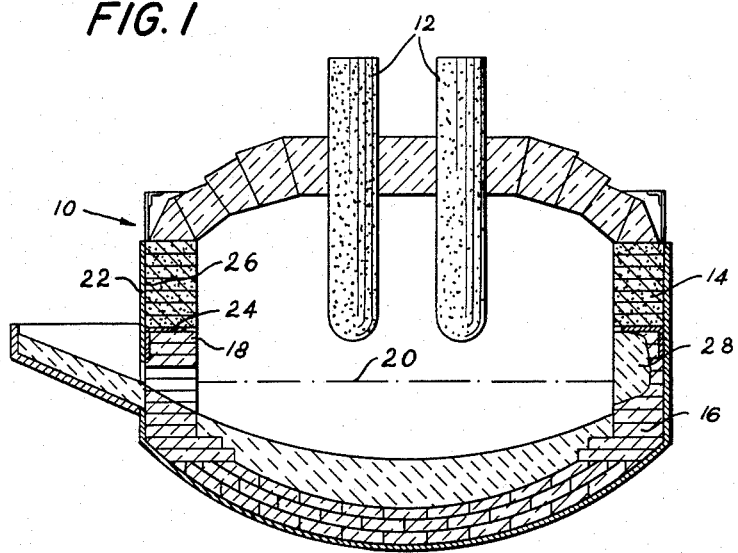
FIGURE 1 is a vertical partially sectioned view of a typical electric arc steel-making furnace having the invention embodied therein.

Referring now to the drawing, and particularly to FIGURE 1, there is shown an electric-arc steel-making furnace 10 having a plurality of electrodes 12, an upper carbonaceous refractory brick lining 14 and a lower ceramic refractory brick lining 16, the uppermost row of the lower lining 16 ending as indicated at 18 at a point which is slightly above the slag line 20.

The linings 14 and 16 are in juxtaposition with the furnace shell wall 22. The upper carbonaceous lining 14 is supported by at least one metallic brace or shelf 24 which is secured to the furnace shell wall 22 suitably by a weld or other conventional mounting method. One supporting shelf for the entire upper refractory lining is preferred since it is desirable to minimize the heat loss conducted through such supporting means, and from a thermal expansion viewpoint, it is preferable to have one fixed point rather than a plurality of fixed points intermediate said refractories. The shelf 24 extends horizontally around the inside periphery 26 of the furnace shell wall 22 and is generally of L shape but can be otherwise shaped to suit a particular design.

The shelf 24 preferably juts inward radially towards the central axis of the furnace 10 in an amount sufficient to support the particular upper carbonaceous lining utilized in a furnace. Suitably, the shelf 24 should extend radially inward from the furnace shell wall 22 at least two-thirds of the original thickness of the refractory linings 14 and 16. By this construction, even if all or part of the lower ceramic brick lining 16 wears away completely as at 28, the upper carbonaceous brick lining 14 will not tumble into the furnace. The shelf 24 is shielded by the refractory linings 14 and 16 and by the refractory mortars and cements which are used with same. If desired, the first row of the upper carbonaceous lining 14 can be notched (not shown) to shield the hot edge of the shelf 24 (edge nearest the electrodes).

Figure 2:
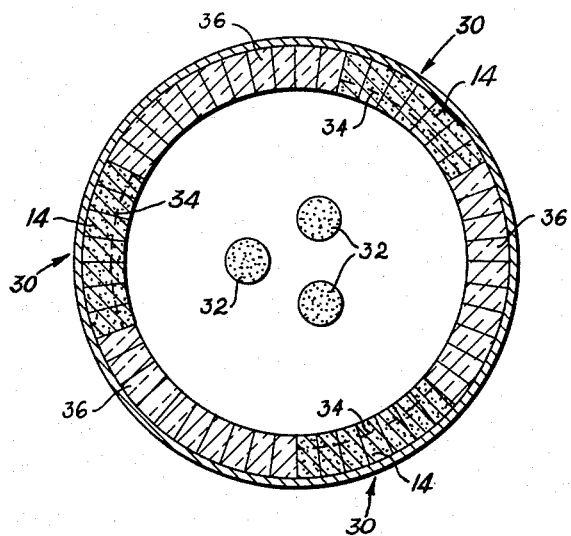
FIGURE 2 is a plan view in section of the furnace shown in FIGURE 1 but slightly modified and with its roof removed.

In FIGURE 2 there is illustrated a plan view of the furnace shown in FIGURE 1 but slightly modified. As shown, only the upper segmental areas 30 nearest an electrode 32 are lined with the carbonaceous bricks 14 since these areas are exposed to higher temperatures and severe erosion. Each segmental area 30 is supported by a shelf 34 in the same manner as described above. If desired, the remaining wall segments 36 may also be supported in a like manner.

Figure 3:
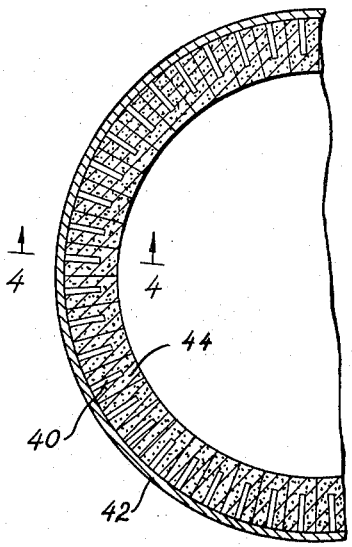
FIGURE 3 is a partial plan view in section of a modified support suitable for use in the furnace illustrated in FIGURES 1 and 2.
Figure 4:
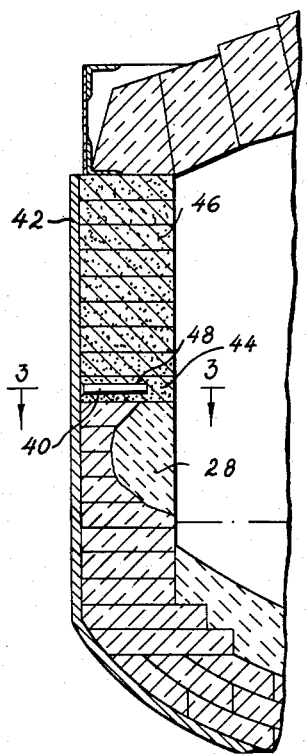
FIGURE 4 is a sectional view in elevation and taken along plane 4—4 of FIGURE 3.

FIGURES 3 and 4 illustrate another embodiment of the invention. A plurality of round studs 40 are shown secured to the furnace shell wall 42 suitably by welds. An initial row 44 of an upper carbonaceous brick lining 46 contains a blind aperture 48 in each brick of the initial row 44 for receiving a stud 40. Sufficient clearance is provided for in the apertures 48 to allow for the relative difference of the coefficients of thermal expansion of the studs 40 and the refractory. The carbonaceous brick lining 46 shown in FIGURES 3 and 4 are identical to those shown in FIGURES 1 and 2 save for the row 44 having the apertures 48. Other shaped bricks can be made that will be compatible with the inventive concept set forth herein such as keyed bricks, although the simple rectangular shape illustrated is more desirable. Of course, the studs 40 can be in any shape desired.

It will be appreciated that many modifications of the invention are possible and will be apparent to those skilled in the art. For example, the shelf can be made an integral part of the structural furnace wall.

What is claimed is:

1. In an electric arc steel-making furnace comprising a furnace shell wall and having a lower ceramic refractory brick lining and an upper carbonaceous refractory brick lining, the uppermost row of said lower lining being in juxtaposition with the lowermost row of said upper lining at a point above the slag line of said furnace; the improvement which comprises a plurality of metallic studs secured to said furnace shell wall in a substantially horizontal plane intersecting said lowermost row of said upper refractory brick lining, each of said bricks of said lowermost row being provided with a blind aperture which is of a sufficient dimension to receive one of said studs, said studs supporting said lowermost row and said upper refractory lining and said studs being shielded by said bricks of said lowermost row.

2. An electric arc steel-making furnace comprising a furnace shell wall having a lower ceramic refractory brick lining and an upper carbonaceous refractory brick lining about the interior of said shell wall, said linings abutting each other above the slag line of said furnace, a plurality of metallic studs secured to said furnace shell wall forming a supporting member for said upper carbonaceous brick lining, each of said bricks of the lowermost row of said upper carbonaceous lining being substantially supported by at least one of said studs and said studs being shielded by a refractory material and extending radially inward from said furnace wall at least two-thirds of the original thickness of said refractory linings.

References Cited by the Examiner

UNITED STATES PATENTS

| | | | |
|---|---|---|---|
| 811,223 | 1/06 | Houze | 263—46 |
| 1,237,283 | 8/17 | Bergman | 266—47 |
| 1,358,703 | 11/20 | Bryson | 263—46 |
| 1,464,543 | 8/23 | Sauvageon | 13—35 X |
| 2,029,492 | 2/36 | Linder | 263—46 |
| 2,343,443 | 3/44 | Brooke | 13—9 |
| 2,451,679 | 10/48 | Komorowski | 266—43 |
| 2,950,570 | 8/60 | Cowles et al. | 266—43 X |

FOREIGN PATENTS

| | | |
|---|---|---|
| 1,025,699 | 1/53 | France. |

CHARLES SUKALO, *Primary Examiner.*

JOHN J. CAMBY, *Examiner.*